United States Patent [19]  
Martin et al.

[11] Patent Number: 4,759,654  
[45] Date of Patent: Jul. 26, 1988

[54] CLAMPING DEVICE

[75] Inventors: Graham L. Martin, Bradford; Neil F. Gill, Shipley, both of Great Britain

[73] Assignee: Lindapter International Limited, Bradford, England

[21] Appl. No.: 52,545

[22] Filed: May 20, 1987

[30] Foreign Application Priority Data

May 20, 1986 [GB] United Kingdom ................. 8612280

[51] Int. Cl.⁴ .............................................. F16B 2/02
[52] U.S. Cl. ...................................... 403/387; 24/486; 248/228
[58] Field of Search ................. 24/490, 458, 486, 514, 24/525, 535, 541; 403/387; 248/72, 228; 52/507

[56] References Cited

U.S. PATENT DOCUMENTS

| 1,474,059 | 11/1923 | Noellmecke | 248/72 |
| 3,003,735 | 10/1961 | Havener | 248/228 |
| 3,257,134 | 6/1966 | Boyd et al. | 403/387 |
| 3,298,153 | 1/1967 | Rolland | 52/507 |
| 3,463,428 | 8/1969 | Kindorf et al. | 248/72 |
| 3,524,666 | 8/1970 | Schilf et al. | 403/387 |
| 3,567,169 | 3/1971 | Frederick | 248/228 |
| 3,577,316 | 5/1971 | Piette | 403/387 |
| 4,180,343 | 12/1979 | Finlay | 403/387 |
| 4,362,422 | 12/1982 | Zinkann et al. | 403/387 |
| 4,367,972 | 1/1983 | Panthout . | |
| 4,439,900 | 4/1984 | Lowe | 248/72 |

FOREIGN PATENT DOCUMENTS

| 0048574 | 3/1982 | European Pat. Off. . |
| 0076096 | 4/1983 | European Pat. Off. . |
| 2106205 | 8/1972 | Fed. Rep. of Germany . |
| 906240 | 9/1962 | United Kingdom . |

Primary Examiner—Victor N. Sakran  
Attorney, Agent, or Firm—Merchant, Gould, Smith, Edell, Welter & Schmidt

[57] ABSTRACT

There is disclosed a clamping device for holding-down a grid-like support member on an underlying flanged support beam, the device being taken in use from the side of the member which is remote from the beam and partly through a space defined between two generally parallel elongate elements of the member, and being manipulatable so as to bring the device into gripping engagement with a flange of the support beam. The device comprises a saddle portion which is shaped so as to be capable of being non-rotatably seated on said elements at said one side of the member, a clamping portion which is engageable with one side of the flange of the support beam which is remote from the grid-like member, and a threaded fastener which interconnects the saddle portion and the clamping portion and which is operable relatively to draw the portions towards each other in order to clamp the grid-like member to the support beam when the saddle portion is seated on the elements and when the clamping portion is in engagement with the flange of the support beam. The clamping portion has a first part which is engageable with said one side of the flange of the support beam and a second part which is generally diametrically opposed to the first part with respect to the axis of the fastener and which has at least two steps each shaped so as to be capable of seating-engagement with one of the elements on a side thereof remote from said one side of the grip-like member. Upon initial installation of the clamping device, the second part of the clamping portion is rotatable by the fastener, as the latter is tightened, until the second part comes into engagement with said one element and one of said steps comes into seating engagement therewith, whereby further tightening of the fastener causes clamping together of the grid-like member and the support beam.

10 Claims, 5 Drawing Sheets

CLAMPING DEVICE

This invention relates to a clamping device for holding-down a grid-like support member onto a support beam.

In the context of this specification, a "grid-like support member" is intended to refer to a support member having at least two generally elongate and longitudinally extending elements which are laterally spaced apart so as to define one or more spaces therebetween, and which are interconnected so as to form a substantially rigid structure.

BACKGROUND OF THE INVENTION

The invention has been developed primarily in relation to a clamping device which can be used to hold-down metal grids (or gratings) on support beams, such grids being of the type which can be used as decking, and particularly for marine use e.g. on oil and gas drilling platforms. Grids of this type are useful as decking in a marine environment, in that they can provide a sufficiently strong support surface, and yet can readily permit any water which falls on the decking to drain away by gravity through the spaces which are defined between the generally elongate elements or "bars" of the grid.

It is well known to use various types of clamping device in order to secure or hold-down grids onto structural beams of a supporting structure. The lateral gaps between adjacent bars of grids are often relatively narrow, so that it can be a difficult task, with existing construction of clamping device or "fastener", to install and to tighten the device. Thus, the lower part of the device has to be passed downwardly through the space, and then has to be manipulated so as to make initial engagement with a part of an underlying support beam. Thereafter, the device has to be tightened, and in such a way that the lower part does not decome disengaged from the underlying support beam. It is a common experience, with many existing types of fastener, that an initial "hold" of a lower engaging part becomes disengaged when initial tightening of the fastener takes place.

Therefore, and particularly bearing in mind the arduous operating conditions which are liable to occur during the installation of decking on drilling rigs or platforms, there is a clear need to provide an improved design of clamping device for holding-down a grid on a support beam (e.g. for use as decking), in which the initial installation of the device, and the subsequent tightening, can be carried out readily and without undue manipulation, and in which the entire operation can be carried out from one side of the grid (usually the upper side), without the operator having to insert his hand or fingers through the space between two bars of the grid in order to hold and/or manipulate the lower part of the clamping device.

SUMMARY OF THE INVENTION

According to the invention there is provided a clamping device for holding-down a grid-like support member on an underlying flanged support beam, the device being taken in use from the side of the member which is remote from the beam and partly through a space defined through two generally parallel elongate elements of the member, and being manipulatable so as to bring the device into gripping engagement with a flange of the support beam, and the device comprising:

a saddle portion which is shaped so as to be capable of being non-rotatably seated on said elements at said one side of the member, a clamping portion which is engageable with one side of the flange of the support beam which is remote from the grid-like member, and a threaded fastener which interconnects the saddle portion and the clamping portion and which is operable relatively to draw the portions towards each other in order to clamp the grid-like member to the support beam when the saddle portion is seated on the elements and when the clamping portion is in engagement with the flange of the support beam;

in which the clamping portion has a first part which is engageable with said one side of the flange of the support beam and a second part which is generally diametrically opposed to the first part with respect to the axis of the fastener and which has at least two steps each shaped so as to be capable of seating-engagement with one of the elements on a side thereof remote from said one side of the grid-like member;

and in which, upon initial installation of the clamping device, the second part of the clamping portion is rotatable by the fastener, as the latter is tightened, until the second part comes into engagement with said one element and one of said steps comes into seating engagement therewith, whereby further tightening of the fastener causes clamping together of the grid-like member and the support beam.

A clamping device according to the invention is particularly suitable for use in holding-down a grid-like decking or grating on flanged support beams, such as I-beams, in which case a number of the clamping devices will be used, each being taken partly through a respective space in the decking which is sufficiently close to an underlying top flange of a support beam so that gripping engagement can take place with the underside of the flange via the first part of the clamping portion.

The particular "step" of the second part which makes seating-engagement with the underside of said element of the grid will depend primarily upon the thickness of the flange. In a preferred embodiment, more than two steps will be provided, so that the clamping device can readily cooperate with a range of flange thicknesses. The clamping device is automatically able to compensate for different flange thicknesses, in that it will continue to be rotatable by the fastener (when the device is initially installed in position on the grid and extends downwardly into a respective space) until such time as one of the steps comes snugly into engagement with the underside of said one of the elements.

Conveniently, the clamping portion is elongate and of dimensions generally corresponding with but smaller than the dimensions of the space between the elements, to enable the clamping portion to be lowered into position, and then rotated into firm engagement with the flange of the underlying support beam.

Preferably, each step is shaped so that the "tread" portion thereof slopes gently downwardly to meet the lower end of the adjacent "riser", whereby stable seating of the element can be achieved. The further tightening of the clamping device tends to press the respective riser against a side face of the element, and the corresponding step is drawn upwardly into firm engagement with the underside of the element.

Conveniently, the first part has a curved engaging nose by which it engages the underside of the flange, and this enables the clamping device to rock to a limited extent about the nose during the initial stages of engagement of the clamping portion with the underside of the flange (via the first part) and with the underside of the element (via the second part), until the appropriate step of the second part comes fully into seating engagement with the element.

The saddle portion is, as indicated above, capable of non-rotative seating engagement with the elements and, usually, this will be the upper edges of the elements. Typically, the elongate elements of a grid-like decking are formed by flat strips or bars, and preferably the saddle portion includes an inverted U or channel which is able to slide downwardly onto and to embrace one of the bars, so as to resist any tendency for the saddle portion to rotate as the fastener is tightened.

It is preferred that the channel engages with the upper region of the same element (said one element) which has its lower region engaged by the second part of the clamping portion.

The saddle portion may include a further inverted channel, into which can fit the upper region of the other bar. However, this further channel may be larger in width than the thickness of the other bar, so that the clamping device can readily be fitted across any two adjacent bars of a range of constructions of grids having different lateral spacings between adjacent bars.

In a preferred embodiment, a saddle portion takes the general form of an inverted "top hat" section, in which the two inverted channels merge into a larger U-shaped member. The U-shaped member fits into the space between the two bars, and preferably also serves to mount the threaded fastener. The threaded fastener engages via its thread with the clamping portion, and preferably has a rugged design of head which enables the fastener to be tightly secured by a suitable tool from the upper side of the grid. One preferred arrangement of head has a hexagonal socket to receive a heavy duty Allen tool.

To ensure that the installer correctly positions the clamping device, so that the first part engages the underside of the flange and the second part engages the underside of the bar (rather than vice versa), an arrow or other indication may be provided on the saddle portion and also on the clamping portion, and the device should be installed so that both arrows point towards the corresponding support beam, and the device is then moved in that direction until the first part engages the underside of the flange and the fastener comes into abutment with the edge of the part engages the underside of the flange and the fastener comes into abutment with the edge of the flange.

DESCRIPTION OF PREFERRED EMBODIMENT

Figure 1:
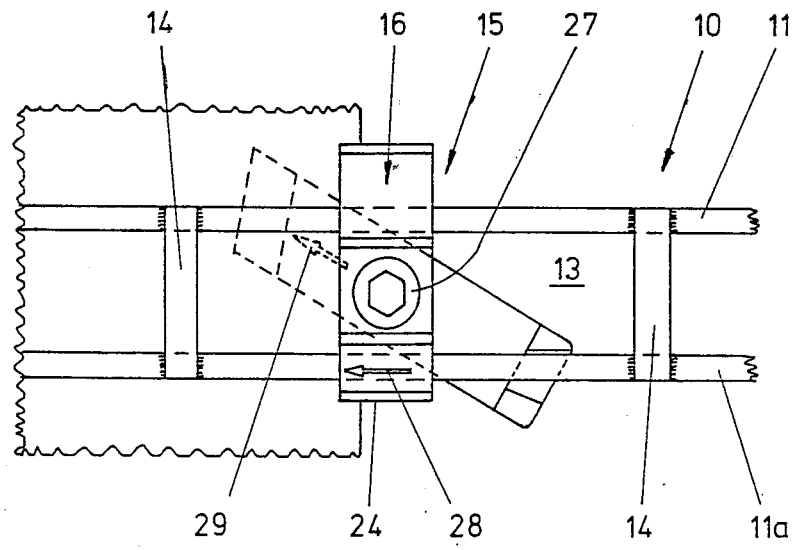
FIG. 1 is a plan view of a detail of a grid-like support member with which a clamping device according to the invention may be used.
Figure 2:
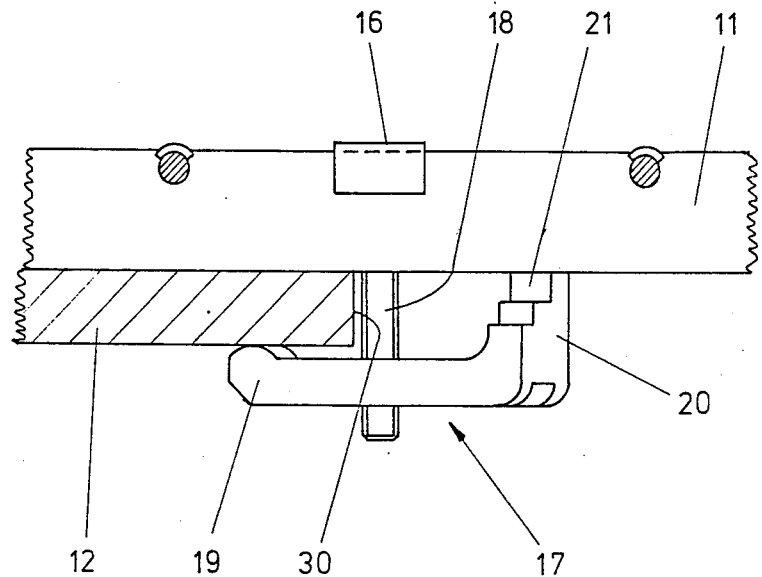
FIG. 2 is a side view, partly in section, illustrating the clamping device in an assembled position holding-down the grid-like support member on a support beam.

Referring now to FIGS. 1 and 2 of the drawings, there is shown a detailed part of a grid-like support member (referred to hereinafter as a "grid") which can be held-down on a flanged support beam, using a clamping device according to the invention. The grid is designated generally by reference 10, and includes a set of generally elongate and parallel elements 11 in the form of flat strips or bars. The grid 10 may be formed so as to be suitable for use as decking in a marine environment e.g. on a drilling rig platform. A supporting structure for the decking is formed by a plurality of horizontal flanged support beams 12a (see FIG. 5), a typical flange being designated by reference 12 in FIG. 2. The flange 12 may form, for example, the top flange of an I-beam. The elements 11 are laterally spaced apart from each other in order to define a plurality of spaces 13 therebetween, and the elements 11 are laterally interconnected by spacers 14 so that each pair of adjacent elements 11 form a substantially rigid, though water permeable structure.

A clamping device according to the invention is designated generally by reference 15, and can be used to hold-down the grid 10 at any desired location on an underlying flanged support beam. The clamping device 15 will usually be applied from the side of the grid 10 which is remote from the underlying support beam i.e. from the upper side, and is taken partly through a corresponding space 13, and is thereafter manipulated so as to bring the device into gripping engagement with the underside of flange 12, as shown in FIG. 2.

Figure 3A:
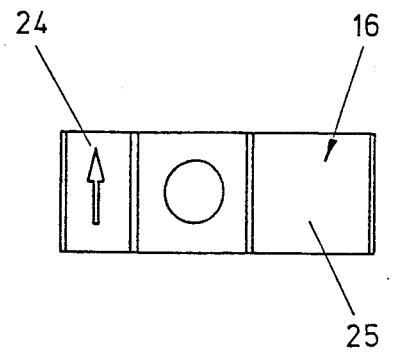
FIGS. 3a to 3c are respectively, plan view, side view and under plan view of a saddle portion of the clamping device according to the invention.
Figure 3B:
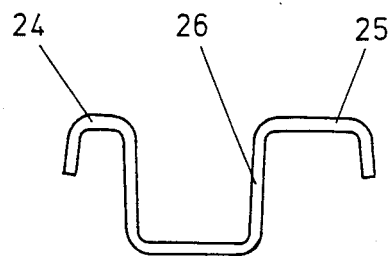
Figure 3C:
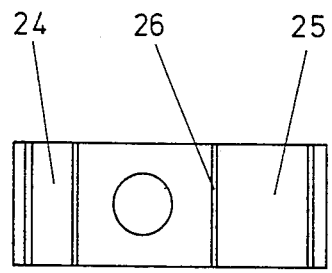
Figure 4A:
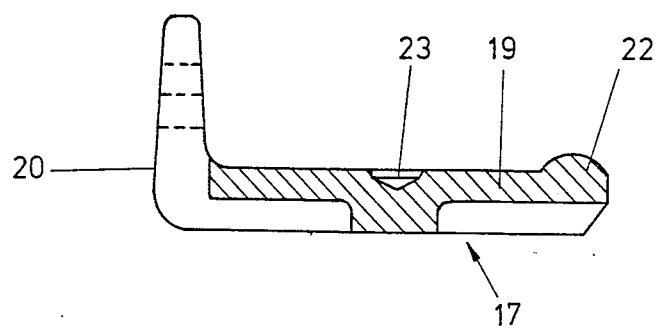
FIGS. 4a to 4e are detailed views of a clamping portion of the clamping device according to the invention; and, FIG. 5 is a schematic illustration of a grid mounted on underlying support beams via clamping devices according to the invention.
Figure 4B:
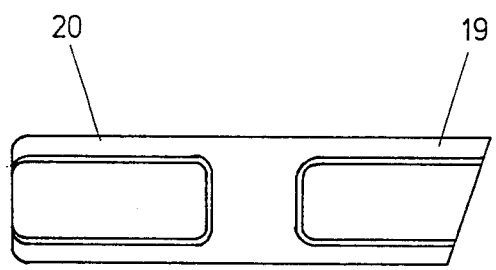
Figure 4C:
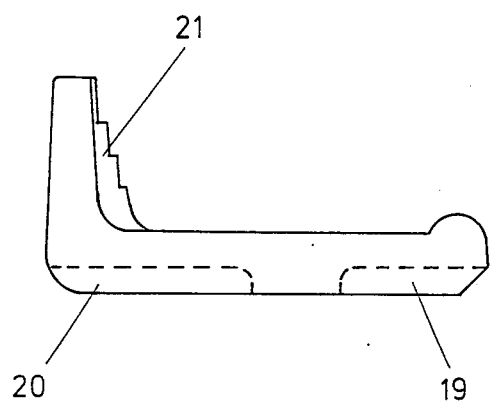
Figure 4E:
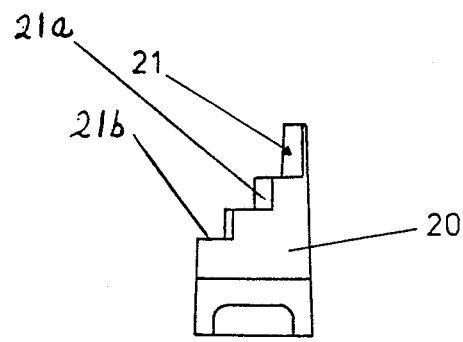
Figure 4D:
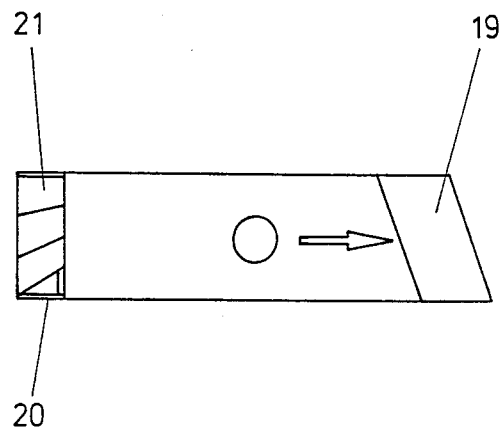

The clamping device 15 comprises a saddle portion 16, which is shown in more detail in FIGS. 3a to 3c, and which is shaped so as to be capable of being non-rotatably seated on the upper regions of the elements 11. The device 15 also includes a clamping portion 17, which is shown in more detail in FIGS. 4a to 4e, and which is engageable with the underside of flange 12 i.e. the side of the flange 12 which is remote from the grid 10. A threaded fastener 18, which takes the form, in the illustrated embodiment, of an Allen bolt, interconnects the saddle portion 16 and the clamping portion 17, and is operable relatively to draw the portions 16 and 17 towards each other in order to clamp the grid 10 to the support beam when the saddle portion 16 is seated on the elements 11 and when the clamping portion 17 is in engagement with the underside of the flange 12.

The clamping portion 17 has a first part 19 which is engageable with the underside of the flange 12, and a second part 20 which is generally diametrically opposed to the first part 19 with respect to the axis of the fastener 18, and which has at least two steps 21, each step being shaped so as to be capable of seating-engagement with the underside of one of the elements 11. Thus, upon initial installation of the clamping device 15, in which the saddle portion 16 is placed on the upper edges of the elements 11, and the fastener 18 and clamping device 17 are passed downwardly through a corresponding one of the spaces 13, the clamping portion 17 can be rotated by the fastener 18, as the latter is tightened, until the second part 20 comes into engagement with a side face of one of the elements 11, which is designated by reference 11a in FIG. 1. The particular one of the steps 21 which engages the underside of element 11a will depend upon the thickness of the flange 12, and it will be the "riser" 21a of the step which engages the side face of the element 11a, and thereafter resists any further attempt to rotate the clamping portion 17 by the fastener 18. The corresponding "tread" portion 21b of the step will fit snugly against the surface of the lower edge of element 11a, and further tightening of the fastener 18 will then cause clamping together of the grid 10 with the underlying support beam.

In the illustrated embodiment, more than two steps 21 are provided, so that the clamping device 15 can readily cooperate with a range of flange thicknesses. The clamping device is able to compensate automatically for different flange thicknesses, in that it will continue to be rotatable by the fastener 18 (when the device is initially installed in position on the grid and extends downwardly into the space 13) until such time as an appropriate one of the steps 21 comes snugly into engagement with the underside of the element 11a. In addition, the tread portion 21b of each step 21 may slope gently downward to meet the lower end of the riser 21a, in order to provide stable seating of the element 11a thereon.

The construction of the clamping portion 17 is shown in more detail in FIGS. 4a to 4e. In particular, the first part 19 has a curved engaging nose 22 by which it engages the underside of the flange 12, and this enables the clamping device 15 to rock to a limited extent about the nose 22 during the initial stages of engagement of the clamping portion 17 with the underside of the flange 12, via the first part 19, and with the underside of the element 11a via the second part 20. During these initial stages, the appropriate step 21 of the second part 20 comes fully into seating engagement with the element 11a. The lower end of the fastener 18 has threaded engagement with the clamping portion 17 by being received in a tapped hole 23 formed through a middle region of the clamping portion 17.

The construction of the saddle portion 16 is shown in more detail in FIGS. 3a to 3c and it is, as indicated above, capable of non-rotative seating engagement with the elements 11. The saddle portion 16 includes a first inverted U or channel 24 which is able to slide downwardly onto and to embrace the upper region of the element 11a, so as to resist any tendency for the saddle portion 16 to rotate as the fastener 18 is tightened. It will be noted from FIG. 1 that the channel 24 engages with the upper region of the same element (11a) which has its lower region engaged by one of the steps 21 of the second part 20 of the clamping portion 17. The saddle portion 16 includes a further inverted channel 25, and this fits readily onto the upper region of the other one of the bars 11, in that it is larger in width than the thickness of the other bar, so that the clamping device 15 can readily be fitted across any two adjacent bars of a range of constructions of grids having different lateral spacings between adjacent bars.

As will be seen particularly from FIG. 3b, the saddle portion 16 takes the general form of an inverted "top hat" section, in which the two inverted channels 24 and 25 merge into a larger U-shaped member 26. The member 26 fits into the space 13 defined between the two elements 11, and has a hole in its base in which the fastener 18 is rotatably mounted.

The fastener 18 has a head 27 with a hexagonal socket, to permit the fastener to be rotated by means of a heavy duty Allen key.

To ensure that the installer correctly positions the clamping device 15, so that the first part 19 engages the underside of the flange 12 and the second part 20 engages the underside of element 11a, an arrow 28 or other indication is provided on the saddle portion 16, and an arrow 29 is provided on the first part of the clamping portion 17. This indicates how the device should be installed, in that both arrows 28 and 29 should point towards the corresponding support beam to which the grid is to be attached, and the device 15 is then moved in that direction until the first part 19 engages the underside of the flange 12 and the fastener 18 comes into abutment with the edge 30 of the flange 12.

Figure 5:
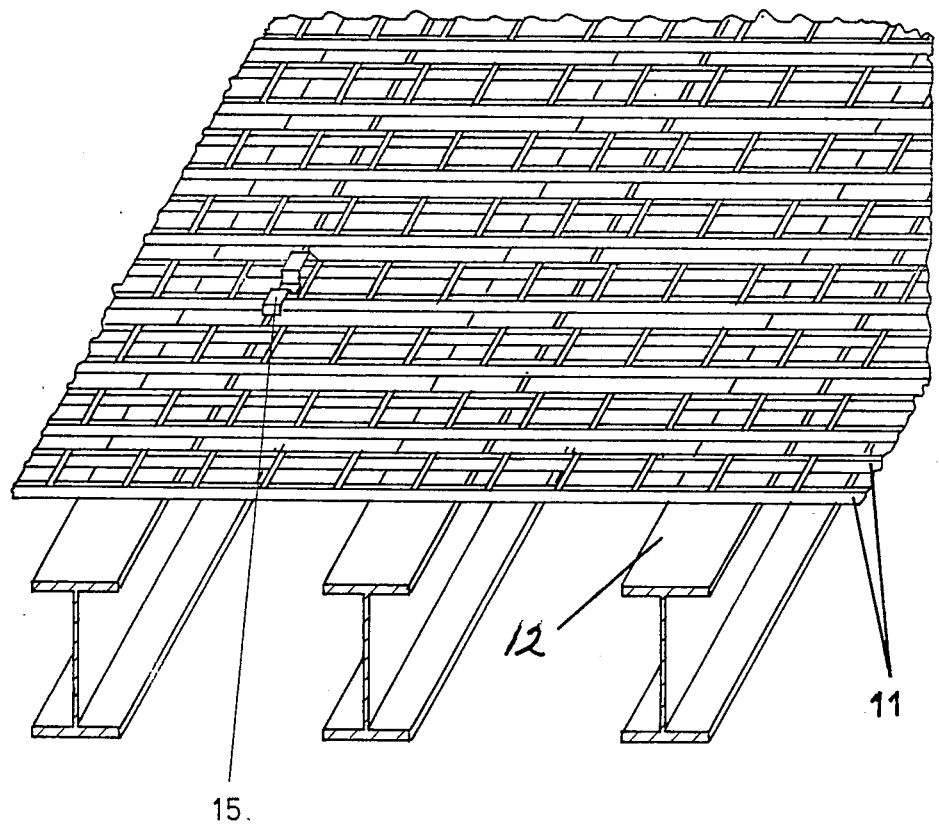

FIG. 5 illustrates schematically a deck mounted on underlying support beams using clamping devices according to the invention. Parts corresponding with those already described are designated by the same reference numerals, and will not be described in detail again.

Having regard to the above description of a preferred embodiment of the invention, it will be evident that it provides an improved design of clamping device for holding-down a grid on a support beam, particularly for use as decking, in which the initial installation, and the subsequent tightening of the clamping device can readily be carried out from one side (the upper side) without undue manipulation, and without the installer having to attempt to complete the installation, and the tightening, by inserting his hand or fingers through the space between two bars of the grid in order to hold and/or to manipulate the lower part (the clamping portion) of the clamping device.

In FIGS. 1 to 5, there is shown an arrangement whereby one or more clamping devices (15) according to the invention may be used to hold-down a grid on a plurality of laterally spaced and parallel support beams, in which longitudinal strips or bars (11) (from which the grid is made) extend perpendicular to the support beams. However, it should be understood that the clamping device could be used as readily in order to hold-down a grid on support beams in an arrangement wherein the strips or bars extend parallel to the beams, in which case the underlying clamping portion (17) will be manipulated into a position in which it extends parallel to the saddle portion (16) in order to engage the underside of the flange (12).

We claim:

1. A clamping device for holding down a grid-like support member on an underlying flanged support beam, the device being taken in use from one side of the member which is remote from the beam and partly through a space defined between two generally parallel elongate elements of the member, and being manipulatable so as to bring the device into gripping engagement with a flange of the support beam, and the device comprising:

a saddle portion which is shaped so as to be capable of being non-rotatably seated on said elements at said one side of the member, a clamping portion which is engageable with one side of the flange of the support beam which is remote from the grid-like member, and a threaded fastener which interconnects the saddle portion and the clamping portion and which is operable relatively to draw the saddle portion and the clamping portion towards each other in order to clamp the grid-like member to the support beam when the saddle portion is seated on the elements and when the clamping portion is in engagement with the flange of the support beam;

the clamping portion having a first part which is engageable with said one side of the flange of the support beam and a second part which is generally diameterically opposed to the first part with respect to the axis of the fastener and which has at least two steps facing laterally of the general longitudinal axis of the clamping portion and each step having first and second surfaces extending in planes substantially perpendicular to each other with each first surface facing an inside face of one of the elements of the grid-like member; and the arrangement being such that, upon initial installation of the clamping device, the second part of the clamping portion is rotatable by the fastener until the first surface of one of the steps comes into engagement with the inside face of said one element and the second surface of the step fits under the lower edge of said one element, whereby further tightening of the fastner causes clamping together of the grid-like member and the support beam.

2. A clamping device according to claim 1, in which the second part of the clamping portion is provided with more than two steps so that the clamping device can cooperate with a range of thicknesses of beam flange.

3. A clasping device according to claim 2, in which the second surface of each step slopes gently downward to meet the lower end of the corresponding first surface of the step.

4. A clamping device according to claim 2 in which the clamping portion comprises an elongate strip of dimensions generally corresponding with but smaller than the dimensions of the space between the elements, to enable the clamping portion to be lowered into position, and then rotated into firm engagement with the flange of the underlying support beam.

5. A clamping device according to claim 2, in which the first part of the clamping portion has a curved engaging nose for engaging the flange of the underlying support beam to enable the clamping device to rock to a limited extend about the nose during the initial stages of engagement of the clamping portion with the flange and with said one element.

6. A clamping device according to claim 2, in which the saddle portion includes an inverted channel member which is slidably engageable onto a flat strip or bar forming said one element, in order to hold the saddle portion captive aganist rotation.

7. A clamping device according to claim 6, in which the saddle portion includes a further inverted channel for seating on the other of the elements and of greater width than said channel member, to permit use of the clamping device with grids having different lateral spacings between adjacent elements.

8. A clamping device according to claim 7, in which the saddle portion comprises an inverted "top hat" section, in which said channels merge into a larger U-shaped member.

9. A clamping device according to claim 2, in which indication means is provided on the saddle portion and the clamping portion for indicating the correct mode of installation of the device.

10. A clamping device according to claim 2, in which the inclination of the first surfaces of the steps to the longitudinal axis of the clamping portion varies from step to step, whereby the first surface of any one of the steps can be brought into substantially flush engagement with the inside face of said one element upon rotation of the clamping portion.

* * * * *

UNITED STATES PATENT AND TRADEMARK OFFICE
CERTIFICATE OF CORRECTION

PATENT NO. : 4,759,654

DATED : Jul. 26, 1988

INVENTOR(S) : Graham L. Martin, et al.

It is certified that error appears in the above-identified patent and that said Letters Patent is hereby corrected as shown below:

Column 7, line 15, "fastner" should be --fastener--;

Column 8, line 12, "aganist" should be --against--;

In Claim 3, line 1, "2" should be --1--;

In Claim 4, line 1, "2" should be --1--;

In Claim 5, line 1, "2" should be --1--;

In Claim 6, line 1, "2" should be --1--;

In Claim 9, line 1, "2" should be --1--;

In Claim 10, line 1, "2" should be --1--;

Column 7, line 23, "clasping" should be --clamping--.

Signed and Sealed this

Seventh Day of March, 1989

Attest:

DONALD J. QUIGG

Attesting Officer

Commissioner of Patents and Trademarks